United States Patent [19]

Gelernt

[11] Patent Number: 4,479,927

[45] Date of Patent: Oct. 30, 1984

[54] REGENERABLE COLD TRAP FOR ALUMINUM CHLORIDE EFFLUENT

[75] Inventor: Barry Gelernt, Bridgeport, Conn.

[73] Assignee: The Perkin-Elmer Corporation, Norwalk, Conn.

[21] Appl. No.: 406,625

[22] Filed: Aug. 9, 1982

[51] Int. Cl.³ ............................................. C01B 7/01
[52] U.S. Cl. ........................................ 423/481; 55/69; 55/71; 55/82; 55/269; 23/294 R; 423/495; 62/55.5
[58] Field of Search ................. 55/71, 72, 82, 69, 269; 62/55.5, 12, 46; 423/481, 495; 23/294

[56] References Cited

U.S. PATENT DOCUMENTS

| | | | |
|---|---|---|---|
| 1,478,750 | 12/1923 | McElroy | 55/72 |
| 2,450,289 | 9/1948 | Marek | 55/208 |
| 2,813,786 | 11/1957 | Milliken | 55/71 |
| 3,690,827 | 9/1972 | Garrett | 423/281 |
| 4,252,772 | 2/1981 | Way | 55/269 |

FOREIGN PATENT DOCUMENTS

| | | | |
|---|---|---|---|
| 30147 | 8/1977 | Japan | 55/71 |
| 2037966 | 7/1980 | United Kingdom | 62/12 |

Primary Examiner—Bernard Nozick
Attorney, Agent, or Firm—Thomas P. Murphy; Edwin T. Grimes; Francis L. Masselle

[57] ABSTRACT

Aluminum chloride gases and other gases from a processing system are directed to a cold trap including a blower connected thereto. The blower directs the gases, except for the aluminum chloride, out of the cold trap. The aluminum chloride is solidified in the trap. Means including a heater are provided to convert the solid aluminum chloride to a vapor and selectively empty the aluminum chloride out of the cold trap into another trap associated with means for chemically treating the aluminum chloride. The cold trap is then cooled and ready to receive additional aluminum chloride from the processing system.

5 Claims, 1 Drawing Figure

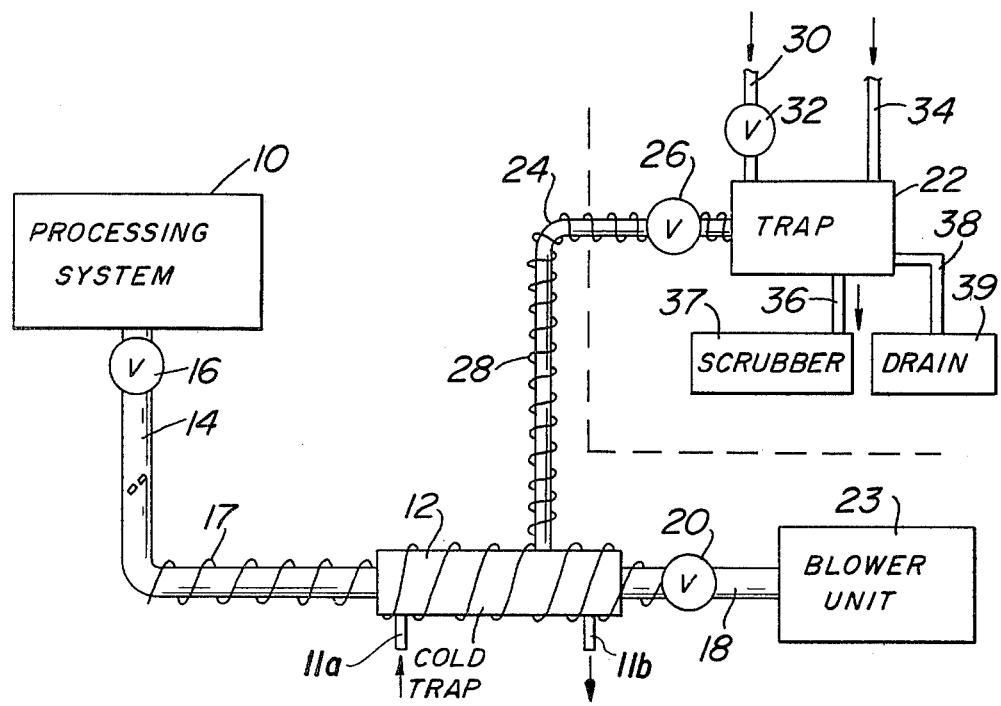

REGENERABLE COLD TRAP FOR ALUMINUM CHLORIDE EFFLUENT

BACKGROUND OF THE INVENTION

In many processing systems, aluminum chloride is an inevitable by-product. One such processing system involves aluminum etching. Such etching is used in printed circuit manufacture and the manufacture of micro-miniature circuits utilizing silicon wafers, for example. Such etching systems generally generate a number of different gases including aluminum chloride.

Aluminum chloride is a corrosive and toxic powder that reacts violently with water and is very difficult to handle. Generally, the aluminum chloride is removed from the processing system by means of cold traps. The traps usually have to be handled by an operator who removes the aluminum chloride therefrom. Handling of these traps and the various operations relating to aluminum chloride is dangerous to the operator. In addition, such cold traps used heretofore have used liquid nitrogen at temperatures of about −196° or other such liquid material which are dangerous to handle.

OBJECTS OF THE INVENTION

It is a primary object of this invention to provide improved methods and means for receiving and disposing aluminum chloride from a processing system and chemically breaking down the aluminum chloride.

It is a further object of this invention to provide improved methods and means for removing aluminum chloride from a processing system in which aluminum chloride is dispensed without an operator coming into contact with the aluminum chloride or the traps used to accumulate the aluminum chloride.

It is still a further object of this invention to provide a system which utilizes non-cryogenic traps which are relatively safe because they do not use liquid materials such as nitrogen for cooling.

SUMMARY OF THE INVENTION

In accordance with the present invention, method and means are employed to receive aluminum chloride from a processing system, such as an aluminum etching processing operation. Aluminum chloride gases, along with other gases, are transferred from the processing system to a cold trap through a suitable conduit. The other gases are forced through the cold traps by a blower while the aluminum chloride gases are solidified in the trap. The cold trap is connected to an outlet conduit and a normally closed outlet valve to a second trap. After the aluminum chloride has been accumulated in the cold trap, the inlet conduit is blocked by closing the inlet valve and the path to the second conduit to the second trap is opened by opening the outlet valve. The cold trap is then heated to vaporize the aluminum chloride and the second trap is cooled causing the aluminum chloride in the cold trap to be transferred from the cold trap to the second trap. After the transfer has taken place, the first conduit is reopened by opening the inlet valve and the second conduit is closed by closing the outlet valve to permit the new aluminum chloride to pass from the processing system to the cold trap. The aluminum chloride in the second trap is chemically treated and dispensed with by suitable means and the second trap is cleaned to receive a new batch of aluminum chloride at a selected time. The process is continuously repeated without the need for an operator handling the cold trap including the aluminum chloride.

Other objects and advantages of the present invention will be apparent and suggest themselves to those skilled in the art from a reading of the following specification and claims, taken in conjunction with the accompanying drawing.

BRIEF DESCRIPTION OF THE DRAWING

The sole FIGURE of the drawing is a block diagram illustrating a system for receiving and dispensing aluminum chloride received from a processing system, in accordance with the present invention.

DESCRIPTION OF THE INVENTION

Referring to the drawing, a processing 10, which, for example, may be an aluminum etching system, is of the type which normally produces an aluminum chloride gaseous by-product, as well as other gases. The aluminum chloride and other gases are transmitted out of the processing system 10 to a cold trap 12. A blower unit 23 forces the other gases from the cold trap 12 through a normally open valve 20 and conduit 18. The aluminum chloride gases, however, do not pass through the cold trap 12, but solidifies into a powder. The cold trap 12 is designated to accumulate and hold aluminum chloride powder after it is received from the processing system 10. A cold trap is well known and, for example, may be made of nylon material. The cold trap 12 may be cooled by any suitable non-cryogenic material, e.g., by water passing through trap 12 via conduits 11a and 11b. The cold trap is generally a vessel for receiving gases therein, which is subjected to low temperatures to trap certain cases therein by causing them to solidify. The cold trap 12 in the present invention is a non-cryogenic cold trap.

A conduit 14 includes a valve 16 which may be selectively opened or closed to block or unblock the passageway between the processing system 10 and the cold trap 12. Heating means 17 which may be a resistance heated coil heated by conventional means, may be associated with the conduit 14 for reasons to be subsequently discussed. The second conduit 18 including the valve 20 therein is connected from the cold trap 12 to the blower unit package 23 to pass gases, other than aluminum chloride through the cold trap 12.

During normal operation, the valve 16 and the valve 20 are normally open to permit the passage of the aluminum chloride gas and other gases to the cold trap 12 to pass the other gases and trap the aluminum chloride. Heretofore, the trap 12 had to be handled by an operator who discarded the aluminum chloride accumulated in the trap. Also, such cold traps utilized dangerous liquid coolants. The present invention is directed towards the means for eliminating the need for an operator handling the cold trap 12 or coming into close contact with the aluminum chloride.

The cold trap 12 is connected to a second trap 22 through a third conduit 24 having a valve 26 therein adapted to be selectively opened or closed. Heating means 28, which may be a resistance heating coil, is disposed to heat the conduit 24. A conduit 30 includes a valve 32, which is adapted to be selectively opened or closed, is also connected to the second trap 22. The purpose of the conduit 30 is to permit water to be inserted into the trap 22 for a reason to be discussed. Another conduit 34 connected to the tank 22 is provided to permit a coolant to enter into the tank 22. An acid drain pipe or conduit 36 is connected to the trap 22 to lead acid therefrom to any form of disposal unit or scrubber 37.

During operation of the processing system 10, the valve 16 and the valve 20 are normally open, the valve 26 is normally closed and the valve 30 is normally closed. The aluminum chloride from the processing system 10 is fed to and then trapped in the cold trap 12.

In the regenerative cycle, the valves 16, 20 and 30 are closed and the valve 26 is opened. The heater 17 heats the trap 12 and all the plumbing associated therewith including the valves 16 and 20 with the heater 28 heating the conduit 24 leading to the trap 22. At the same time, the trap 22 is cooled by a coolant from the conduit 34. The aluminum chloride powder is vaporized in the trap 12 and passes to the trap 22 where it is again trapped or solidifed. After the aluminum chloride has been transmitted to the trap 22, the valve 26 is closed. The trap 12 may then be cooled and the valves 16 and 20 reopened to permit the normal operation of the processing system 10.

While the processing is taking place, the aluminum chloride transmitted to the trap 22 is chemically treated. The trap 22 is flushed with $H_2O$ by opening the valve 30 to permit the water to pass through the conduit 32. When the water enters the trap 22 with the aluminum chloride therein, a chemical reaction takes place and hydrogen chloride is developed. The hydrogen chloride is inserted into a suitable scrubber 37 through a conduit 36. The hydrogen chloride solution, which is very acid, goes down the drain 39 through the conduit 38.

After the trap 22 has been emptied and flushed, it is dried for approximately 8 hours with dry warmed nitrogen, for example. The entire system is then ready for a new cycle of operation similar to that one just described.

In the system described, the regenerative part of the system for dispensing with the aluminum chloride may be made separate from the main processing system. The trap 12 and associated plumbing including the valves 16 and 20 are never exposed to water or hydrochloric acid while trap 22 never contacts chlorine or boron trichloride ($BCL_3$). In addition to these advantages, no operator handling is required of the cold trap 12 containing the aluminum chloride and the cold trap 12 does not require nitrogen liquid coolants thereby minimizing danger to operators.

Transfer of the aluminum chloride from the trap 12 to the trap 22 may also be accomplished with a stream of inner gas. If this is done slowly, high efficiency of the trap 22 is not required. Both flow rates from the trap 12 to the trap 22 reduces the trapping efficiency of the trap 22.

The trap 12 may have to be made of a bakable trap material as well as the lines and valves associated therewith.

In practicing the present invention, it is contemplated that the processing system would be in operation for a given time with the system then being shut down. To accomplish this, all the different valves involved may be opened or closed at the same time by an electrical control circuit or other means, not illustrated.

What is claimed is:

1. In a chemical processing system which produces aluminum chloride gas as a by-product,
    a process for rendering said aluminum chloride gas harmless comprising the steps of:
    selectively transferring said aluminum chloride gas to a cold trap,
    cooling said cold trap to cause said aluminum chloride gas to solidify while said system is in operation,
    heating said cold trap to cause said aluminum chloride solid to vaporize while the operation of said processing system is discontinued,
    transferring said aluminum chloride vapor to a second trap,
    cooling said second trap to cause said aluminum chloride vapor to solidify,
    injecting water into said second trap for reaction with said aluminum chloride to form hydrogen chloride,
    draining said hydrogen chloride from said second trap.

2. A process as set forth in claim 1 wherein said step of selectively transferring said aluminum chloride to said cold trap comprises the step of selectively opening and closing a valve connected in a conduit between said processing system and said cold trap.

3. A process as set forth in claim 2 wherein said chemical treatment station comprises a second trap and the step of transferring said aluminum chloride to said second trap comprises the step of selectively opening and closing a second valve connected in a second conduit between said cold trap and said second trap.

4. A process as set forth in claim 3 wherein the additional steps are provided of selectively closing said second valve when said first valve is opened during the operation of said processing system and for selectively closing said first valve when said second valve is opened when said operation is discontinued.

5. Apparatus for removing aluminum chloride gas from a group of by-product gases generated in a chemical processing system,
    first trap means connected in said processing system for receiving said by-product gases,
    means for cooling said first trap means as said by-product gases pass therethrough to solidify and trap the aluminum chloride in said first trap,
    means for heating said first trap means to vaporize said aluminum chloride gas after a predetermined amount has been solidified,
    second trap means connected to said first trap means for collecting said vaporized aluminum chloride,
    valve means disposed between said first and second trap means to open only to permit passage of said aluminum chloride gas to said second trap means,
    means for cooling said second trap means to solidify said aluminum chloride gas,
    means for inserting water into said second trap means for reacting with the aluminum chloride to form hydrogen chloride,
    means for draining the hydrogen chloride from said second trap means.

* * * * *